(12) United States Patent
Block et al.

(10) Patent No.: US 8,468,172 B2
(45) Date of Patent: Jun. 18, 2013

(54) INTEGRATED APPLICATION SERVER AND DATA SERVER PROCESSES WITH MATCHING DATA FORMATS

(75) Inventors: Meinolf Block, Heidelberg (DE);
Martin Strenge, Nussloch (DE);
Christian Mohr, Heidelberg (DE);
Boris Gruschko, Heidelberg (DE);
Franz Faerber, Walldorf (DE)

(73) Assignee: SAP AG, Walldorf (DE)

( * ) Notice: Subject to any disclaimer, the term of this patent is extended or adjusted under 35 U.S.C. 154(b) by 277 days.

(21) Appl. No.: 12/979,233

(22) Filed: Dec. 27, 2010

(65) Prior Publication Data
US 2011/0282914 A1 Nov. 17, 2011

Related U.S. Application Data

(60) Provisional application No. 61/334,996, filed on May 14, 2010.

(51) Int. Cl.
*G06F 7/00* (2006.01)

(52) U.S. Cl.
USPC .......................................... 707/793

(58) Field of Classification Search
USPC .............................. 707/793, 809
See application file for complete search history.

(56) References Cited

U.S. PATENT DOCUMENTS

| | | | |
|---|---|---|---|
| 6,401,138 B1 * | 6/2002 | Judge et al. | 719/328 |
| 2001/0018684 A1 | 8/2001 | Mild et al. | |
| 2003/0236764 A1 * | 12/2003 | Shur | 707/1 |
| 2004/0015474 A1 * | 1/2004 | Anonsen | 707/1 |
| 2004/0199906 A1 | 10/2004 | McKnight et al. | |
| 2004/0230690 A1 | 11/2004 | Teh | |
| 2009/0037807 A1 * | 2/2009 | Kuznetsov et al. | 715/234 |
| 2009/0204635 A1 * | 8/2009 | McCormack et al. | 707/103 R |
| 2010/0211598 A1 * | 8/2010 | Martinez et al. | 707/769 |

OTHER PUBLICATIONS

European Search Report, dated Jul. 25, 2011, from a corresponding foreign application, EP 11003862.7.

* cited by examiner

*Primary Examiner* — Amy Ng
(74) *Attorney, Agent, or Firm* — Fountainhead Law Group PC

(57) ABSTRACT

In one embodiment, the present invention includes a computer-implemented method comprising storing data in an application using an application custom data type and application custom data structure. The data is stored in a database using the application custom data type and the application custom data structure. In one embodiment, a request is sent to access the data from the application to the database. The data is retrieved from the database in response to the request in the application custom data type and the application custom data structure. In one embodiment, the data is sent from the database to a shared memory in the application custom data type and the application custom data structure and the data is retrieved by the application from the shared memory in the application custom data type and the application custom data structure.

16 Claims, 6 Drawing Sheets

INTEGRATED APPLICATION SERVER AND DATA SERVER PROCESSES WITH MATCHING DATA FORMATS

CROSS REFERENCE TO RELATED APPLICATIONS

The present disclosure claims priority to U.S. Provisional App. No. 61/334,996 for "Integrated Application Server and Data Server Processes Using Shared Memory" filed May 14, 2010, which is incorporated herein by reference in its entirety for all purposes.

BACKGROUND

The present invention relates to computing, and in particular, to systems and methods for integrating databases and applications using shared memory.

Unless otherwise indicated herein, the approaches described in this section are not prior art to the claims in this application and are not admitted to be prior art by inclusion in this section.

For an application to access data stored in a database, a separate application server and database server are used. The application server requests data from the database through the database server. For example, transfer control protocol/Internet protocol (TCP/IP) or another networking protocol may be used to communicate between the application server and the database server. The database server retrieves the data for the application server. The application server interprets the data and transforms the data into a format that can be processed by the application.

Typically, data is represented differently in databases and applications. An application may have custom application structures and types for processing data, and the database may have different native structures and types for processing data used in the application. Typically, data is transformed as it is transferred between a database and an application.

FIG. 1 shows a typical application and database. Data transferred from application 101 to database 102 is typically transformed at 150 before being stored in a different format in database 102. Similarly, data transferred from database 102 to application 101 is transformed to a different format compatible with application 101. However, such format transformations are time consuming and processor intensive. Additionally, format transformation of the data reduces data throughput and slows down the ability of the application to store and access the data it needs to function. For example, if format transformation is implemented in the application, the application may require additional processor and memory resources. This larger resource footprint will be magnified across each instance of the application, for example. Similarly, if format transformation is implemented in the database, the database may require additional processor and memory resources. For databases serving multiple applications, this larger footprint may impact the performance of multiple applications.

The present disclosure addresses these and other issues with systems and methods for integrating application server and data server processes.

SUMMARY

Embodiments of the present invention include systems and methods for integrating applications and databases. In one embodiment, the present invention includes a computer-implemented method comprising storing data in an application memory of an application operating on an application server, the application memory storing the data using an application custom data type and application custom data structure, wherein the application custom data type and the application custom data structure are custom to a plurality of applications including said application. The data is stored in a database operating on a database server, the database storing the data using the application custom data type and the application custom data structure of the application. In one embodiment, a request is sent to access the data from the application to the database. The data is retrieved from the database in response to the request in the application custom data type and the application custom data structure. In one embodiment, the data is sent from the database to a shared memory in the application custom data type and the application custom data structure and the data is retrieved by the application from the shared memory in the application custom data type and the application custom data structure.

In one embodiment, data is sent from an application and stored in a database and retrieved from the database and sent to the application in a custom application format using shared memory. In one embodiment, data is sent from an application and stored in a database and retrieved from the database and sent to the application in a custom application format using network protocols.

In one embodiment, the application comprises internal tables for storing said data, and wherein the data is stored in the database in a format compatible with the application internal tables using the application custom data type and the application custom data structure.

In one embodiment, the data is retrieved from the database, sent through the shared memory, received by the application, and operated on by the application without data type or data structure conversion.

In one embodiment, the application, the database, and the shared memory are operable on the same host computer system.

In one embodiment, the method further comprises executing a SQL statement, wherein the SQL statement operates on an internal application table and a database table, wherein the internal application table is transferred through the shared memory to the database and the SQL statement is executed by the database against both the internal application table and the database table without converting the application table or the database table.

In one embodiment, the SQL statement is a JOIN.

In one embodiment, stored data in the application memory of the application is provided as a first input to a database operation through the shared memory, and wherein second data from the database is provided as a second input to the database operation, and wherein the database executes the database operation on the data from the application memory and the second data from the database without converting the data from the application memory or the second data from the database.

In one embodiment, the database operation is a JOIN.

In one embodiment, the method further comprises transforming the data type and the data structure of said data from the application custom data type and application custom data structure to a native database data type and a native database data structure within a database process and persisting the transformed data in the native database data type and the native database data structure.

In one embodiment, the method further comprises sending the data from the application memory to the shared memory in the application custom data type and the application custom data structure and retrieving the data by the database from the shared memory in the application custom data type and the application custom data structure, and in accordance therewith, performing the step of storing the data in a database.

In one embodiment, the method further comprises performing an operation on the database, wherein the operation comprises operating on first data and second data, wherein the operation is performed on the first data and second data using the application custom data type when the first and second data both have said application custom data type.

In one embodiment, the method further comprises performing an operation on the database, wherein the operation comprises operating on first data and second data, wherein the operation is performed on the first data and second data using the application custom data structure when the first data and second data both have said application custom data structure.

In one embodiment, the method further comprises receiving a request to perform an operation on first data and second data in the database, wherein the first data is in the application custom data type and the second data is not in the application custom data type, transforming the second data to the application custom data type matching the data type of the first data, and performing the operation on the first data and second data in the application custom data type.

In one embodiment, the method further comprises receiving a request to perform an operation on first data and second data in the database, wherein the first data is in the application custom data structure and the second data is not in the application custom data structure, transforming the second data to the application custom data structure matching the data structure of the first data, and performing, in the database, the operation on the first data and second data in the application custom data structure.

In one embodiment, the present invention includes a non-transitory computer readable storage medium embodying a computer program for performing a method as described herein.

In one embodiment, the present invention includes a system comprising one or more processors, memory, and one or more executable software components, executable by said processors to perform the methods described herein. Processes according to various embodiments described herein may be implemented on one or more computers, such as server computers, for example.

The following detailed description and accompanying drawings provide a better understanding of the nature and advantages of the present invention.

DETAILED DESCRIPTION

Described herein are techniques for model-based processing of user inputs. The apparatuses, methods, and techniques described below may be implemented as a computer program (software) executing on one or more computers. The computer program may further be stored on a non-transitory computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
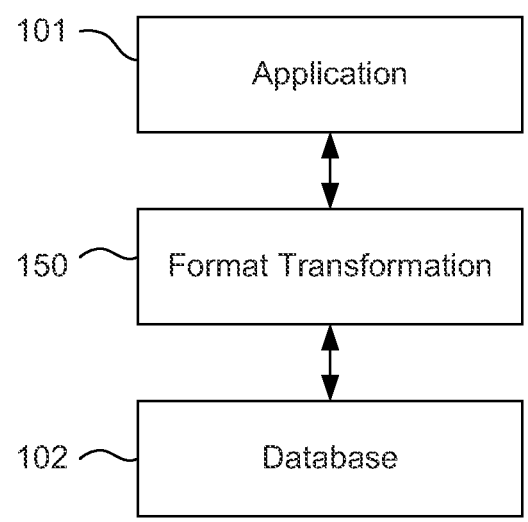
FIG. 1 shows a typical application and database.
Figure 2:
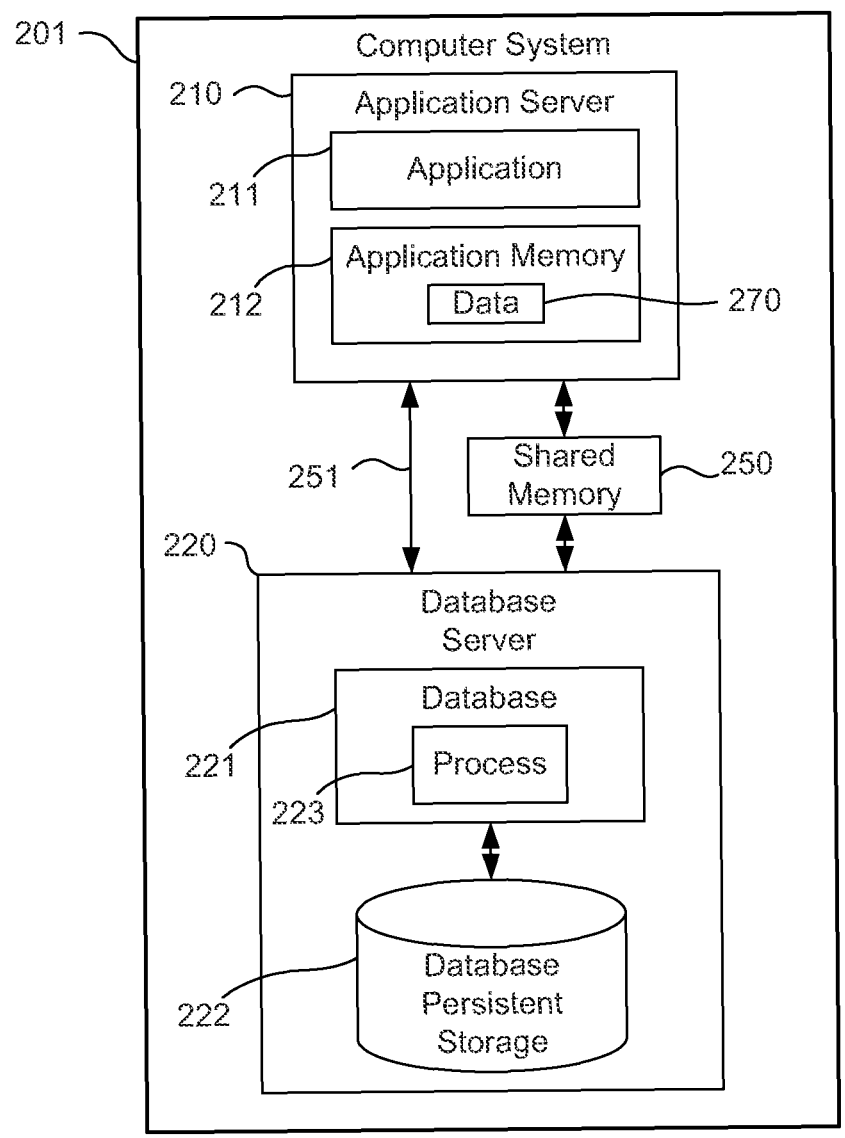
FIG. 2 shows an application and database according to one embodiment.

FIG. 2 shows an application and database according to one embodiment. Computer system 201 may include one computer or multiple computers with different software components operating on different computers. Computer system 201 includes an application server 210 and database server 220. Application server 210 includes an application 211 including executable application code for performing the functions of the application. Application 211 may store data 270 in application memory 212. Application memory 212 may include internal tables, for example, or other data structures for maintaining and manipulating data used by application 211. Application memory 212 may store data corresponding to simple or complex data structures. An internal table is an example of such a data structure. Some data structures may be standard data structures. However, in many instances application 211 may use a data structure that is a custom data structure. Custom data structures may have custom binary representations of the data structure inside application 211. Additionally, data 270 may have various types. For example, application 211 may have data that uses standard data types, such as "Integer" or "Float" represented using standardized binary formats. However, application 211 may have data that is stored in application memory using custom data types. Custom data types may have custom binary representations of the data inside application 211.

Embodiments of the present invention include storing data from application memory 212 in a database. Application server 210 may communicate with a database server 220 over communication channel 250. As described in more detail below, data may be transferred between application server 210 and database server 220 using shared memory 250. Database server 220 includes database 221. Database 221 may be an in-memory database, for example. Database server 220 may include database persistent storage 222, which may be a hard disk drive, for example. The above configuration of application server 210 and database server 220 are illustrative only, and it is to be understood that features and embodiments of the present invention may be implemented in other configurations. In one embodiment, application 211, database 221, and shared memory 250 are operable on the same host computer system.

As mentioned above, in one embodiment, application 211 stores data 270 in an application memory 212 operating on an application server 210. Application memory 212 stores data 270 using an application custom data type and application custom data structure. The application custom data type and the application custom data structure may be custom to a plurality of applications including application 211. One example of custom data types and custom data structures are data structures and data types used in certain ABAP applications from SAP AG®, for example. However, it is to be understood that the features disclosed here apply to other proprietary custom data structures that may be included in applications from other software vendors. Data 270 is stored in database 221 operating on a database server 220. Features and advantages of the present invention include storing data 270 in database 221 using the custom data type and the custom data structure of application 211, rather than storing such data using a different data type and data structure native to database 221. Accordingly, as data is transferred between the application server and the database server 220, data transformations may be reduced or completely eliminated. Additionally, database 221 may be extended to incorporate both data types and data structures native to database 221 as well as the custom data types and data structures from application 211.

In one embodiment, computer system 201 includes shared memory 250, and application server 210 and database server 220 may use shared memory to move data 270 back and forth between the application server 210 and database server 220. For example, if application 211 requires data from database 211, database 211 may retrieve data from the database in the application custom data type and the application custom data structure. Next, the data may be sent from database 211 to shared memory 250 in the application custom data type and the application custom data structure. Finally, the data may be retrieved by application 211 from shared memory 250 in the application custom data type and the application custom data structure. Data access by application 211 may be made faster and more efficient where data is stored using the same binary representation in both the application and the database, thereby allowing data to be moved from the database to shared memory, and from shared memory to the application without a complex and processor intensive transformation step.

Similarly, application 211 may send data to database 221 through shared memory 250. For instance, application data 270 in application memory 212 may be sent to shared memory 250. Data 270 is stored in shared memory in the application custom data type and the application custom data structure. Next, data 270 is sent to database 221. Database 221 may retrieve data 270 from the shared memory in the application custom data type and the application custom data structure and then store the data in a database using the application custom data type and the application custom data structure. Accordingly, data 270 is stored in both application memory 212 and database 221 using the same data type and data structure. Accordingly, data 270 may be retrieved from database 221, sent through the shared memory 250, received by the application 211, and operated on by the application, without data type or data structure conversion.

As mentioned above, some applications may include internal tables for storing data. The internal tables may have custom data structures that defined the tables. As internal tables are created, populated with data, and manipulated by application 211, such tables may be stored in database 221. Storing and retrieving tables between application 211 and database 221 is made more efficient by storing the data structures for the tables in database 221 in a format compatible with the application internal tables using the application custom data type and the application custom data structure. Tables may be created, populated with data, stored in database 221 through shared memory 250, and retrieved back to application memory 212 all using the application custom data type and the application custom data structure to increase the speed and throughput of the data transfer.

In some instances, database server 220 may include an in-memory database where data is persisted (e.g., to a hard disk drive) at certain points of time to database persistent storage 222. For disk optimization purposes, it may be desirable to store data in a native database format. Accordingly, in one embodiment, database server 220 may transform the data type and the data structure of data 270 from application 211 from the application custom data type and application custom data structure to a native database data type and a native database data structure. The transformation may be performed within a database process 223, which may be invoked during a persistence operation, for example. Next, database server 220 may persist the transformed data in the native database data type and the native database data structure. Analogously, when accessing data that has been persisted, database server 220 may transform the data type and the data structure of the persisted data from the native database data type and a native database data structure to the application custom data type and application custom data structure of application 211.

In one embodiment, requests may be sent between application 211 and database 221 using a communication channel 251. For example, communication channel 251 may be a network messaging channel using network protocols, for example. In one embodiment, data may be sent and received between application 211 and database 221 in the application custom data type and application custom data structure over communication channel 251 using, for example, network protocols.

Figure 3:
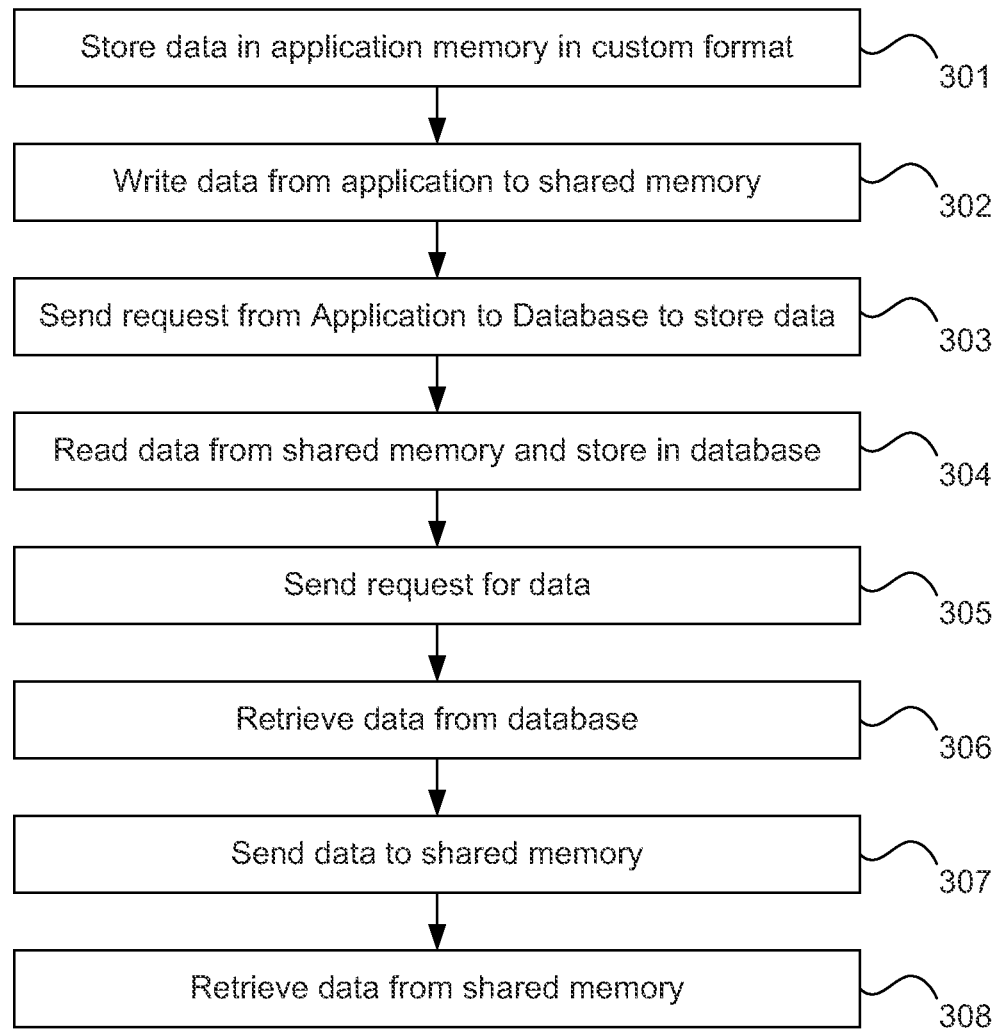
FIG. 3 shows a method according to one embodiment.

FIG. 3 shows a method according to one embodiment. Data may be written to a database from an application and read from the database into an application as follows. For the write case, at 301, data is stored in an application memory in a custom format. The application memory may be coupled to an application operating on an application server, for example. The application memory stores the data using an application custom data type and application custom data structure. The application custom data type and the application custom data structure may be custom to multiple applications including the application coupled to the application memory. At 302, the data is written from the application to a shared memory in the application custom data type and the application custom data structure. At 303, the application may send a request to store the data from the application to the database. The database may be operating on a database server, for example. At 304, the data is read from the shared memory and stored in the database in a custom format. The database stores the data using the application custom data type and the application custom data structure of the application. For the read case, at 305, the application may send a request to the data base to retrieve the data. At 306, the data is retrieved from the database in response to the request in the application custom data type and the application custom data structure. At 307, the data is sent from the database to a shared memory in the application custom data type and the application custom data structure. At 308, the data is retrieved by the application from the shared memory in the application custom data type and the application custom data structure for use in the application.

Figure 4:
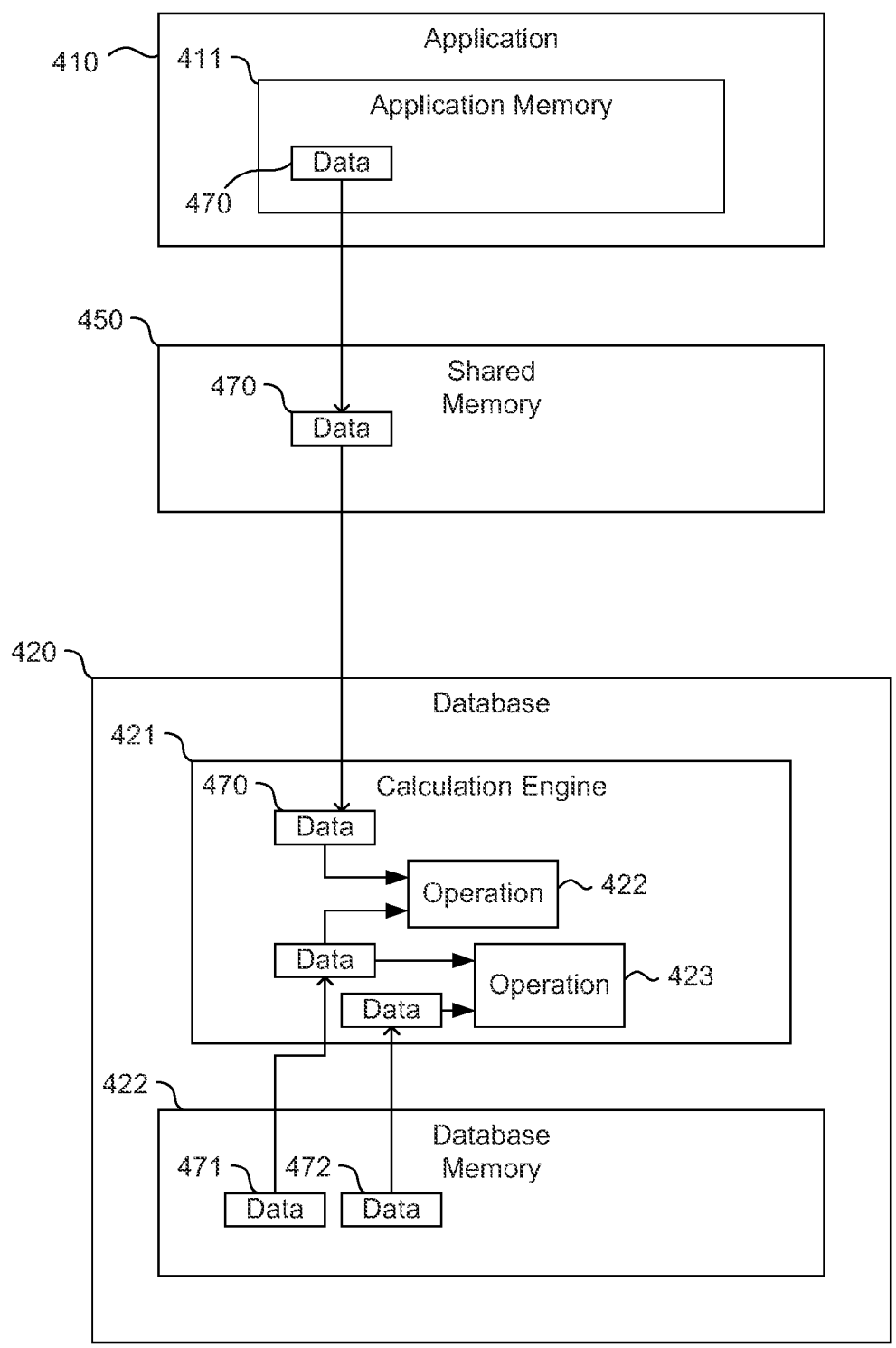
FIG. 4 shows a more detailed example application and database according to one embodiment.

FIG. 4 shows a more detailed example application and database according to one embodiment. Since data is stored in the custom data type and custom data structure used by the application, operations on data may be performed by the database rather than by the application. For instance, in one embodiment, an operation may be performed on database 420. Database 420 may include a calculation engine 421 for executing operations. Calculation engine 421 may perform operations such as SQL or other types of operations such as custom operations, for example. In one embodiment, an operation 423 is performed on the database 420 using first data 471 and second data 472 stored in database memory 421. When the first data 471 and second data 472 both have the custom data type of application 410, operation 423 may be performed on first data 471 and second data 472 and yield a result that is also in the custom data type of application 410. The resulting data may be made immediately available to application 410 through shared memory 450 or stored in database memory 422 for later use in application 410. Similarly, when the first data 471 and second data 472 both have the custom data structure of application 410 (e.g., compatible custom table structures), operation 423 may be performed on first data 471 and second data 472 and yield a result that is also in the custom data structure of application 410.

If first data 471 and second data 472 are in different data formats, transformation may be used to operate on the data. For example, database 420 may receive a request from application 410 to perform an operation on first data 471 and second data 472. The first data 471 may be in the application custom data type and the second data may not be in the application custom data type. Accordingly, the second data 472 may be transformed to the application custom data type matching the data type of the first data 471, for example. The operation may then be performed on the first and second data in the application custom data type and the result may be provided to the application. Similarly, the first data 471 may be in an application custom data structure (e.g., an internal application table) and the second data 472 may not be in the application custom data structure. Accordingly, the second data 472 may be transformed to the application custom data structure to match the data structure of the first data 471, for example. The operation may then be performed on the first and second data in the application custom data structure and the result may be provided to the application.

Due to the efficiency and speed of using shared memory and compatibility of the data format, some embodiments of the present invention may include performing database operations on inputs from both the database and the application. In this example, application memory 411 includes data 470 in an application custom data format (e.g., a custom data type or data structure). Data 470 may be transferred through shared memory 450 to be processed by an operation 422 in database 420. Operation 422 may further operate on data 471 stored in database memory 422 in application custom format. Accordingly, database operators may operate on data from application 410 and the database 420. For example, database 420 may execute a SQL statement, such as a JOIN, where the SQL statement operates on an internal application table from application 410 and a database table. It is to be understood that a variety of other SQL statements may also be performed. The internal application table is transferred through the shared memory 450 to the database 420, and the SQL statement is executed by the database against both the internal application table and the database table without converting the application table or the database table.

Example Hardware

Figure 5:
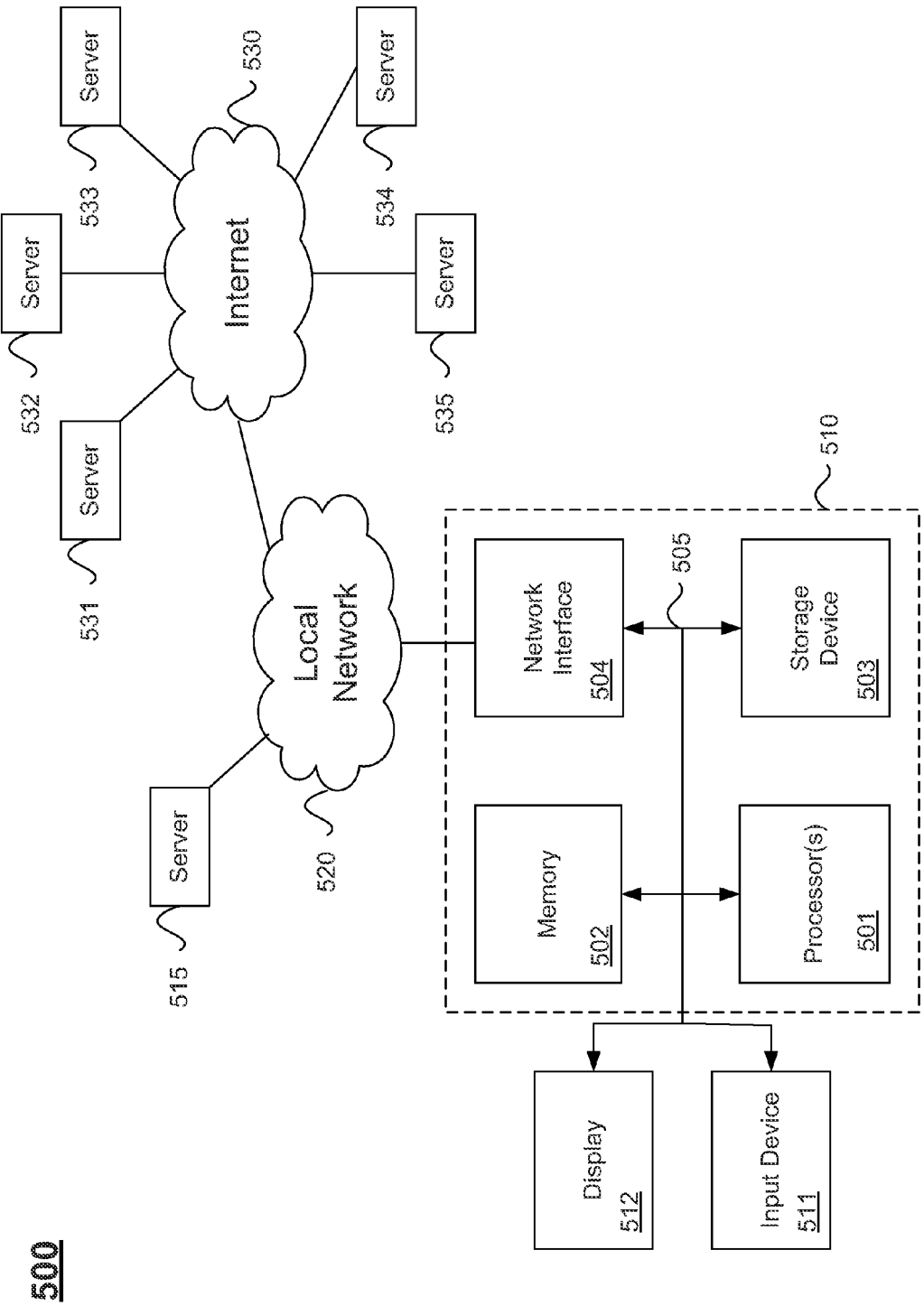
FIG. 5 illustrates hardware of a special purpose computing machine configured with a process according to embodiments of the present invention.

FIG. 5 illustrates hardware of a special purpose computing machine configured with a process according to embodiments of the present invention. An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. In the Internet example, software components or services may reside on multiple different computer systems 510 or servers 531-535 across the network. Servers may include memory, processors, storage devices, and network interfaces as described with reference to computer 510. The processes described above may be implemented on one or more servers, for example. As mentioned above, a memory 502 on a server may include shared memory, and an application server and database server may be operable on a single server system, where one or more processors 501 execute instructions for performing the functions of one or more applications and databases as described above. Alternatively, server 531 may transmit actions or messages from one component, through Internet 530, local network 520, and network interface 504 to a component on computer system 510. The software components and processes described above may be implemented on any computer system and send and/or receive information across a network, for example.

Further Examples

Figure 6:
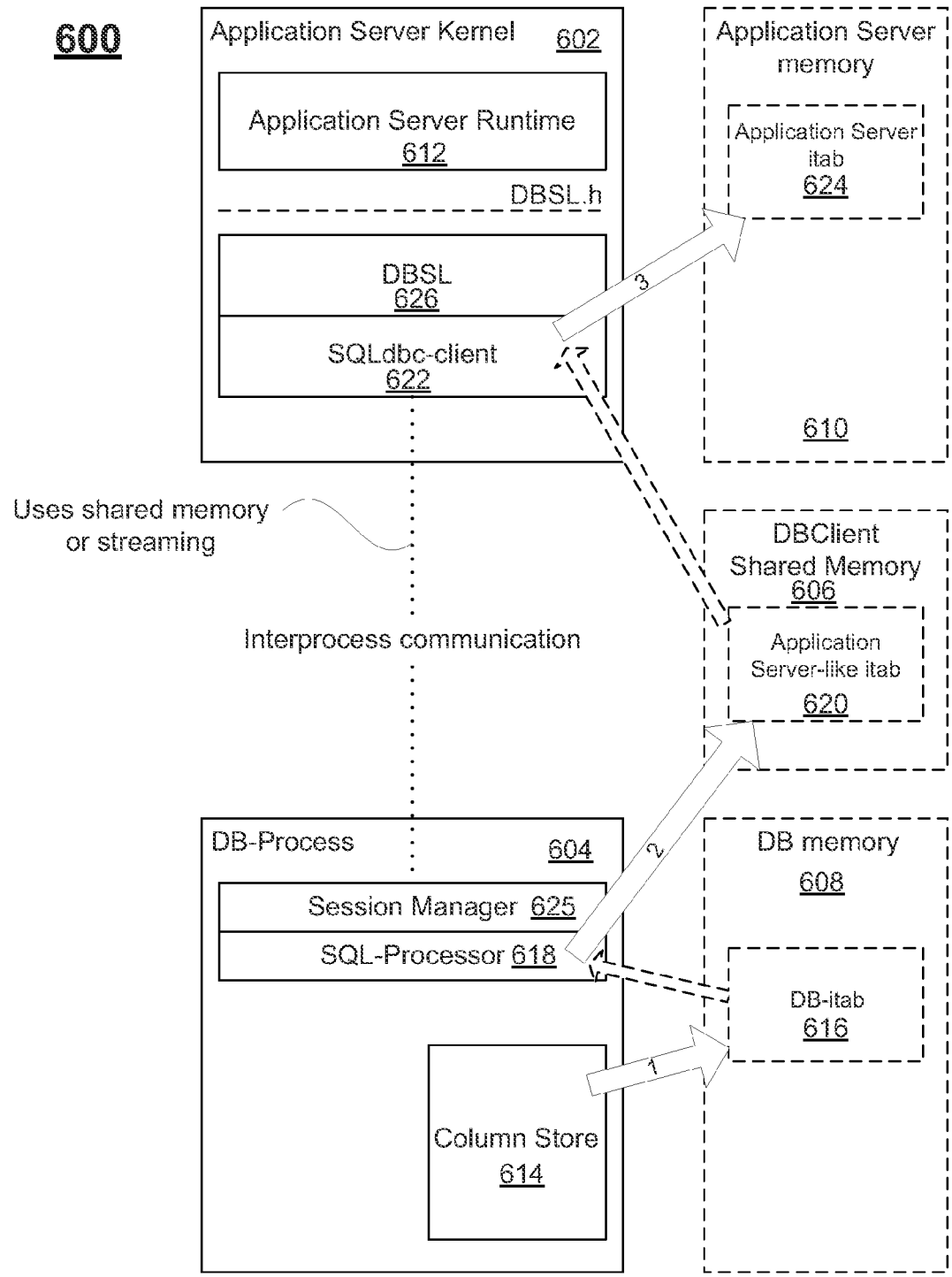
FIG. 6 illustrates another example embodiment of the present invention.

FIG. 6 depicts an example of a server 600 according to one embodiment. Server 600 includes an application server kernel 602. Application server kernel 602 may be a virtual machine (VM) running on server 600 that is configured to execute software code in a computer language, such as an Advanced Business Application Programming (ABAP) language. Server 600 also includes a database server process 604 configured to perform database operations. Database server process 604 may also be implemented as a VM.

Particular embodiments use a shared memory 606 to communicate data between a database memory 608 and an application server memory 610. Shared memory 606 may be memory that can be accessed by multiple applications, such as application server kernel 602 and database server process 604. Communications through a network using transfer control protocol/Internet protocol (TCP/IP) may not be necessary because application server kernel 602 and database server process 604 are implemented and reside on a same server 600, for example.

Interprocess communication may be used to send an application data structure from application server kernel 602 to database server process 604. The application data structure defines a data structure format to store data in an application server memory 610. For example, an application runtime process 612 is a process of the application that accesses data from application server memory 610. Application runtime process 612 may use a language, such as ABAP, to access data that is in a defined format for ABAP. The application data structure may be sent through shared memory 606 or may be streamed or sent through interprocess communications to database server process 604.

Database server process 604 stores data in database memory 608 in a database format. The database format may be column-based. For example, a column store 614 may store the data in an itab 616, which is a structured internal table with data stored by column. Although a column-based format is described, data may be stored by row also.

A structured query language (SQL) processor 618 is configured to access table 616. SQL processor uses a query language, such as SQL, to access the data that is stored in the database format. A session manager 625 may receive the application data structure from application server kernel 602 and provide the application data structure to SQL processor 618. Data in a database may be accessed by several clients. Each client accesses data in the context of a session. During such a session a client performs one or more transactions. Usually a session provides some state that is required to perform the transactions. A session manager manages these sessions and the associated state. Client 622 may provide the application data structure. SQL processor 618 then uses the application data structure to transform itab 616 into an application server-like itab 620. Application server-like itab 620 is data that is in a format that can be processed by application server kernel 602. Application server-like itab 620 is then stored in shared memory 606.

SQLdbc (SQL database client) 622 copies application server-like itab 620 from shared memory 606 to an application server itab 624 in application server memory 624. The copy may be a logical copy of a table structure of application server-like itab 620. Because database server process 604 transformed the data according to the application data structure, a copy may be used to store the data into application server memory 610. Application server kernel 602 may not have to transform application server-like itab 620 before storing the data in application server memory 610. The Database service layer (DBSL) provides a translation from generic data access logic that is specified in the application (server) to DBMS-specific data access descriptions (e.g. a specific SQL dialect). As the form of data access is also DBMS-specific, the DB-specific part of the DBSL would use 622 to transfer the data to 610. Application runtime 612 may then access application server itab 624 by executing application code, such as ABAP code.

Accordingly, database server process 604 may perform operations that transform data according to an application data structure. This may use database processing power to perform application-based operations. Transform overhead is thus avoided in application server kernel 602. Additionally, shared memory 606 may be used to copy data from database memory 608 to application server memory 610.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   storing data in an application memory of an application operating on an application server, the application memory storing the data using an application custom data type and application custom data structure, wherein the application custom data type and the application custom data structure are custom to a plurality of applications including said application;
   storing the data in a database operating on a database server, the database storing the data using the application custom data type and the application custom data structure of the application;
   sending a request to access the data from the application to the database;
   retrieving the data, in the application custom data type and the application custom data structure, from the database in response to the request;
   sending the data, in the application custom data type and the application custom data structure, from the database to a shared memory; and
   retrieving the data, in the application custom data type and the application custom data structure, by the application from the shared memory.

2. The method of claim 1 wherein the application comprises internal tables for storing said data, and wherein the data is stored in the database in a format compatible with the application internal tables using the application custom data type and the application custom data structure.

3. The method of claim 1 wherein the data is retrieved from the database, sent through the shared memory, received by the application, and operated on by the application without data type or data structure conversion.

4. The method of claim 1 wherein the application, the database, and the shared memory are operable on the same host computer system.

5. The method of claim 1 further comprising executing a SQL statement, wherein the SQL statement operates on an internal application table and a database table, wherein the internal application table is transferred through the shared memory to the database and the SQL statement is executed by the database against both the internal application table and the database table without converting the application table or the database table.

6. The method of claim 5 wherein SQL statement is a JOIN.

7. The method of claim 1 wherein stored data in the application memory of the application is provided as a first input to a database operation through the shared memory, and wherein second data from the database is provided as a second input to the database operation, and wherein the database executes the database operation on the data from the application memory and the second data from the database without converting the data from the application memory or the second data from the database.

8. The method of claim 7 wherein the database operation is a JOIN.

9. The method of claim 1 further comprising:
transforming the data type and the data structure of said data from the application custom data type and application custom data structure to a native database data type and a native database data structure within a database process; and
persisting the transformed data in the native database data type and the native database data structure.

10. The method of claim 1 further comprising:
sending the data from the application memory to the shared memory in the application custom data type and the application custom data structure; and
retrieving the data by the database from the shared memory in the application custom data type and the application custom data structure, and in accordance therewith, performing the step of storing the data in a database.

11. The method of claim 1 further comprising:
performing an operation on the database, wherein the operation comprises operating on first data and second data, wherein the operation is performed on the first data and second data using the application custom data type when the first and second data both have said application custom data type.

12. The method of claim 1 further comprising:
performing an operation on the database, wherein the operation comprises operating on first data and second data, wherein the operation is performed on the first data and second data using the application custom data structure when the first data and second data both have said application custom data structure.

13. The method of claim 1 further comprising:
receiving a request to perform an operation on first data and second data in the database, wherein the first data is in the application custom data type and the second data is not in the application custom data type;
transforming the second data to the application custom data type matching the data type of the first data; and
performing the operation on the first data and second data in the application custom data type.

14. The method of claim 1 further comprising:
receiving a request to perform an operation on first data and second data in the database, wherein the first data is in the application custom data structure and the second data is not in the application custom data structure;
transforming the second data to the application custom data structure matching the data structure of the first data; and
performing, in the database, the operation on the first data and second data in the application custom data structure.

15. A non-transitory computer readable storage medium embodying a computer program for performing a method, said method comprising:
storing data in an application memory of an application operating on an application server, the application memory storing the data using an application custom data type and application custom data structure, wherein the application custom data type and the application custom data structure are custom to a plurality of applications including said application;
storing the data in a database operating on a database server, the database storing the data using the application custom data type and the application custom data structure of the application;
sending a request to access the data from the application to the database;
retrieving the data, in the application custom data type and the application custom data structure, from the database in response to the request;
sending the data, in the application custom data type and the application custom data structure, from the database to a shared memory; and
retrieving the data, in the application custom data type and the application custom data structure, by the application from the shared memory.

16. A system comprising:
one or more processors;
memory; and
one or more executable software components, executable by said processors to:
store data in an application memory of an application operating on an application server, the application memory storing the data using an application custom data type and application custom data structure, wherein the application custom data type and the application custom data structure are custom to a plurality of applications including said application;
store the data in a database operating on a database server, the database storing the data using the application custom data type and the application custom data structure of the application;
send a request to access the data from the application to the database;
retrieve the data, in the application custom data type and the application custom data structure, from the database in response to the request;
send the data, in the application custom data type and the application custom data structure, from the database to a shared memory; and
retrieve the data, in the application custom data type and the application custom data structure, by the application from the shared memory.

* * * * *